US008312601B2

(12) United States Patent
Huang

(10) Patent No.: US 8,312,601 B2
(45) Date of Patent: Nov. 20, 2012

(54) STRAP-TIGHTENING DEVICE

(76) Inventor: Han-Ching Huang, Taichung (TW)

( * ) Notice: Subject to any disclaimer, the term of this patent is extended or adjusted under 35 U.S.C. 154(b) by 315 days.

(21) Appl. No.: 12/692,364

(22) Filed: Jan. 22, 2010

(65) Prior Publication Data

US 2011/0179609 A1 Jul. 28, 2011

(51) Int. Cl.
*B25B 25/00* (2006.01)

(52) U.S. Cl. ...................... 24/68 CD; 254/218; 410/100

(58) Field of Classification Search ................ 24/68 CD, 24/69 CT, 70 ST; 410/100; 254/218, 247; *B25B 25/00; B61D 45/00*

See application file for complete search history.

(56) References Cited

U.S. PATENT DOCUMENTS 5,103,536 A * 4/1992 Kamper ..................... 24/68 CD
5,205,020 A * 4/1993 Kamper ..................... 24/68 CD
5,369,848 A * 12/1994 Huang ..................... 24/68 CD
5,560,086 A * 10/1996 Huang ..................... 24/68 CD
5,778,496 A * 7/1998 Huang ..................... 24/68 CD
5,894,638 A * 4/1999 Huang ..................... 24/68 CD
5,943,742 A * 8/1999 Huang ..................... 24/68 CD
6,007,053 A * 12/1999 Huang ..................... 254/247
6,641,116 B1 * 11/2003 Huang ..................... 254/218
7,281,701 B1 * 10/2007 Huang ..................... 254/218
7,350,767 B2 * 4/2008 Huang ..................... 254/218
7,503,736 B1 * 3/2009 Chen ..................... 410/100
7,789,603 B2 * 9/2010 Huck ..................... 410/100
7,854,043 B2 * 12/2010 Wang ..................... 24/68 CD
7,874,047 B2 * 1/2011 Breeden ..................... 24/68 CD
2007/0189873 A1 * 8/2007 Breeden ..................... 410/100
2008/0178439 A1 * 7/2008 Huang ..................... 24/68 CD
2008/0307618 A1 * 12/2008 Huang ..................... 24/68 CD
2009/0047091 A1 * 2/2009 Huck ..................... 410/100
2010/0322737 A1 * 12/2010 Huang ..................... 410/100
2011/0271500 A1 * 11/2011 Huang ..................... 24/68 CD

* cited by examiner

*Primary Examiner* — Robert J Sandy
*Assistant Examiner* — Louis Mercado

(57) ABSTRACT

A strap-tightening device includes a frame, a handle connected to the frame and a reel located on the frame. A first detent is located on the frame. A second detent is located on the handle. The second detent includes two horns each including a downward prong and an upward prong. The reel includes a cylinder and two ratcheted wheels attached to the cylinder. The ratcheted wheels are engaged with the upward prongs of the horns of the second detent during pivoting of the handle in a direction to cause the cylinder to reel in a strap. The ratcheted wheels are engaged with the first detent during pivoting of the handle in an opposite direction to prevent the handle from spinning the cylinder to reel out the strap. A withdrawing unit spins the reel to withdraw the strap.

5 Claims, 8 Drawing Sheets

100 12 30 33 32 60 66 64 21 63 51 15 72 71 42 17 65 50 51 10 52 13 70

STRAP-TIGHTENING DEVICE

BACKGROUND OF INVENTION

1. Field of Invention

The present invention relates to a device for tightening two straps for tying goods on a truck.

2. Related Prior Art

There are various strap-tightening devices. Some of them are not equipped with drawing units so that the straps have to be manually reeled in, and this is inconvenient. The others are equipped with drawing units for automatically reeling in the straps; however, it is difficult to control the speed of the reeling of the straps, and people might get hurt by the hooks tied to the straps during the reeling.

To overcome the foregoing problem, a strap-tightening device can be equipped with a brake for controlling the speed of the reeling of a strap as disclosed in U.S. Pat. No. 7,503,736, Retractable Tie-Down with Rotation Brake, and Chinese Patent Publication No. 100391645, Strap-Tightening Device with Automatic Reeling. The brake is located on a frame. The brake does not interfere with the withdrawing of the strap normally. Only when a handle is located against the frame, can a first detent be operated to cause the brake to abut and slow the strap.

Because of limited space of the strap-tightening device, the brake inevitably reduces the space left for the strap or other elements, and increases the cost. This is bad for marketing the strap-tightening device as the prices of various materials get higher and higher around the world.

Moreover, when the handle is located against the frame, the first detent must be moved over a lobe formed on the frame in a direction and located against the lobe to restrain the handle from pivoting. The first detent must be moved over the lobe in an opposite direction to allow the pivoting of the handle. This is troublesome.

The present invention is therefore intended to obviate or at least alleviate the problems encountered in prior art.

SUMMARY OF INVENTION

It is the primary objective of the present invention to provide a simple and secure strap-tightening device.

A strap-tightening device includes a frame, a handle connected to the frame and a reel located on the frame. A first detent is located on the frame. A second detent is located on the handle. The second detent includes two horns each including a downward prong and an upward prong. The reel includes a cylinder and two ratcheted wheels attached to the cylinder. The ratcheted wheels are engaged with the upward prongs of the horns of the second detent during pivoting of the handle in a direction to cause the cylinder to reel in a strap. The ratcheted wheels are engaged with the first detent during pivoting of the handle in an opposite direction to prevent the handle from spinning the cylinder to reel out the strap. A withdrawing unit spins the reel to withdraw the strap.

Other advantages and features of the present invention will be apparent from the following description referring to the drawings.

BRIEF DESCRIPTION OF DRAWINGS

The present invention will be described through detailed illustration of the preferred embodiment referring to the drawings where.

DETAILED DESCRIPTION OF PREFERRED EMBODIMENT

Figure 1:
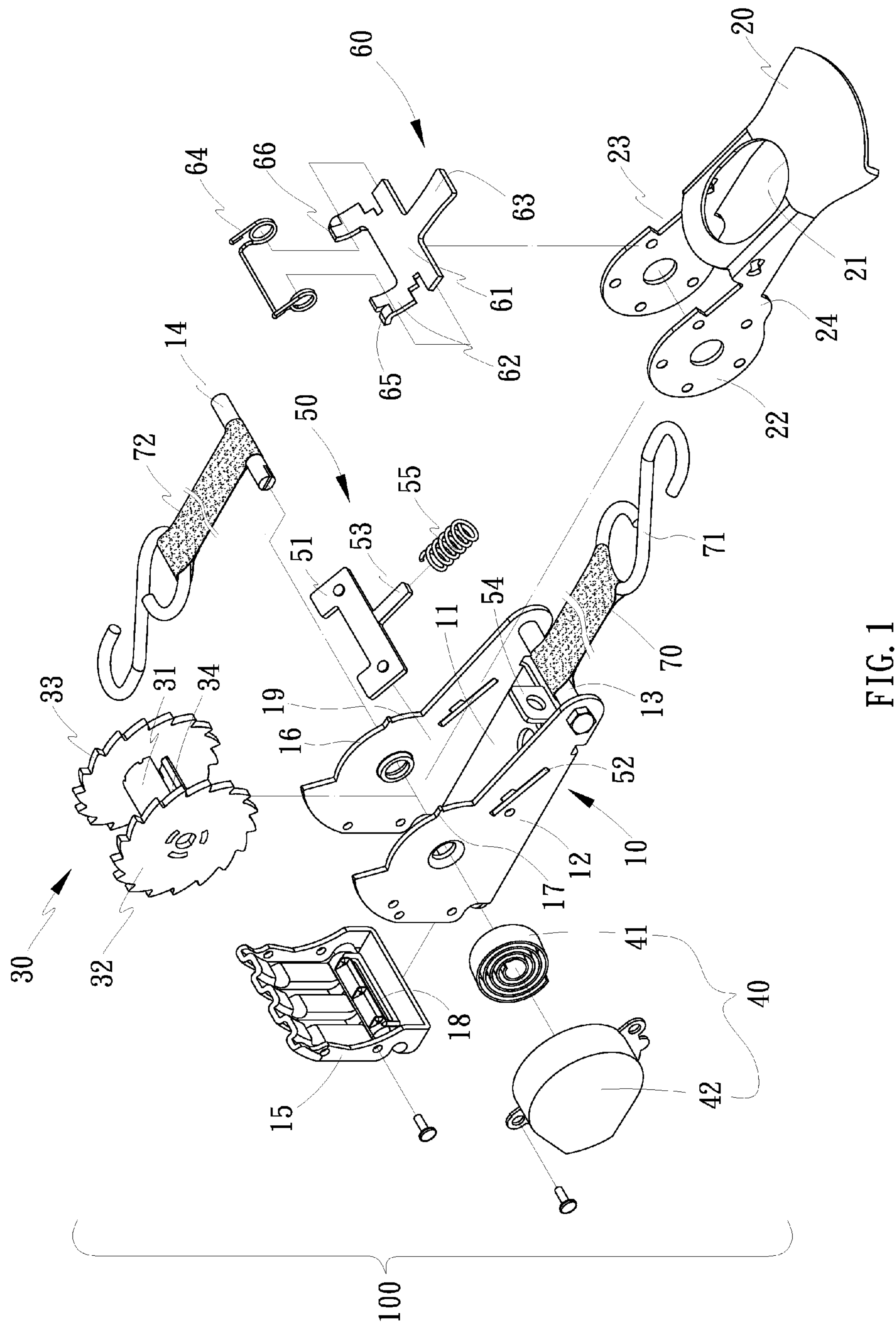
FIG. 1 is an exploded view of a strap-tightening device according to the preferred embodiment of the present invention.
Figure 2:
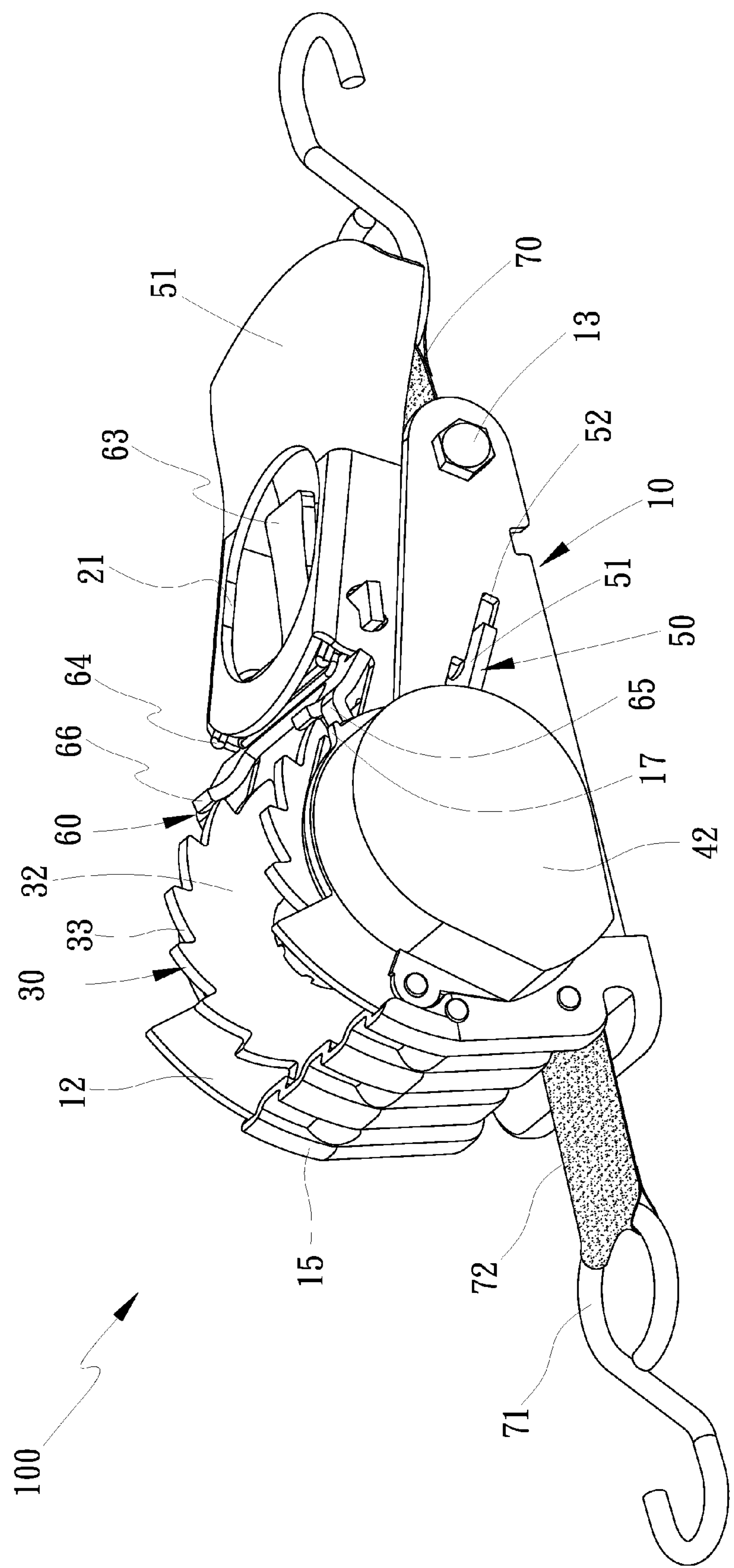
FIG. 2 is a perspective view of the strap-tightening device shown in FIG. 1.

Referring to FIGS. 1 through 5, a strap-tightening device 100 includes a frame 10, a handle 20, a reel 30, a withdrawing unit 40, a first detent 50, a second detent 60, a first strap 71 and a second strap 72 according to the preferred embodiment of the present invention. The frame 10 includes a floor 11 extending between two walls 12. Each of the walls 12 includes a stop 17 formed between two arched edges 16 and 19. A slot 52 is defined in each of the walls 12. A tab 54 extends vertically from the floor 11.

The reel 30 includes a cylinder 31 and two ratcheted wheels 32. The cylinder 31 includes two ends each connected to a related one of the ratcheted wheels 32. The cylinder 31 is a hollow element with a slot 34 defined therein longitudinally.

The withdrawing unit 40 includes an axle 14, a coil spring 41 and a shell 42. The axle 14 includes a slot defined in an end.

The handle 20 includes an opening 21 defined therein and two lateral cams 22 extending forwards. The cams 22 are in parallel to each other. Each of the cams 22 includes a recess 23 defined in an upper section of an arched edge thereof and a lobe 24 formed on a lower section of the arched edge thereof.

The first detent 50 includes two wings 51 and a tail 53 extending backwards from a portion thereof between the wings 51.

The second detent 60 includes two pivots 61, two horns 62 extending forwards from a portion thereof between the pivots 61 and a tail 63 extending backwards from the portion between the pivots 61. Each of the hors 62 includes a prong 65 extending downwards and a prong 66 extending upwards. The prongs 66 are located between the prongs 65.

There is provided a spring 64. The spring 64 includes a rectilinear section extending between two coil-shaped portions.

There is provided a lid 15. The lid 15 includes a slot 18 defined therein.

In assembly, an end of each of the straps 70 and 72 is connected to a hook 71. A crossbar 13 is inserted through a loop formed at another end of the first strap 70. The ends of the crossbar 13 are connected to the walls 12. A loop formed at another end of the second strap 72 is inserted into the cylinder 31 through the slot 34.

The coil-shaped portions of the spring 64 are wound around the pivots 61 of the handle 20. The pivots 61 of the second detent 60 are inserted in two 8-figured apertures defined in the handle 20 so that the second detent 60 is pivotally connected to the handle 20.

A helical spring 55 is provided around the tail 53 of the first detent 50 before the tail 53 of the first detent 50 is inserted through an aperture defined in the tab 54 of the frame 10. The wings 51 of the first detent 50 are movably located in the slots 52 of the frame 10. Thus, the helical spring 55 is compressed between the second detent 50 and the tab 54.

The axle 14 is inserted through an aperture defined in each of the walls 12 of the frame 10, an aperture defined in each of the cams 22 of the handle 20, an aperture defined in each of the ratcheted wheels 32, the cylinder 31, and the loop of the second strap 72. Thus, the handle 20 and the ratcheted wheels 32 are rotationally connected to the frame 10. The axle 14 is securely connected to one of the ratcheted wheels 32, i.e., there is no relative rotation between them. The prongs 66 are engaged with the ratcheted wheels 32.

An internal end of the coil spring 41 is inserted through the slot of the axle 14. An external end of the coil spring 41 is securely connected to an internal portion of the shell 42. The shell 42 is securely connected to one of the walls 12 of the frame 10. The lid 15 is pivotally connected to the walls 12 of the frame 10. The lid 15 covers the ratcheted wheels 32. The hook 71 tied to the second strap 72 is inserted through the slot 18 of the lid 15. Thus, a section of the second strap 72 is also inserted through the slot 18 of the lid 15.

Figure 4:
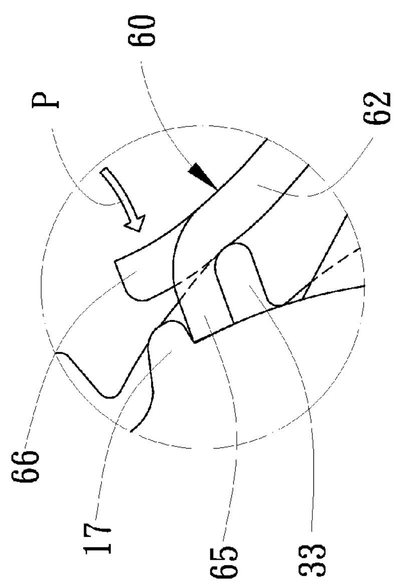
FIG. 4 is an enlarged, partial view of the strap-tightening device shown in FIG. 3.
Figure 3:
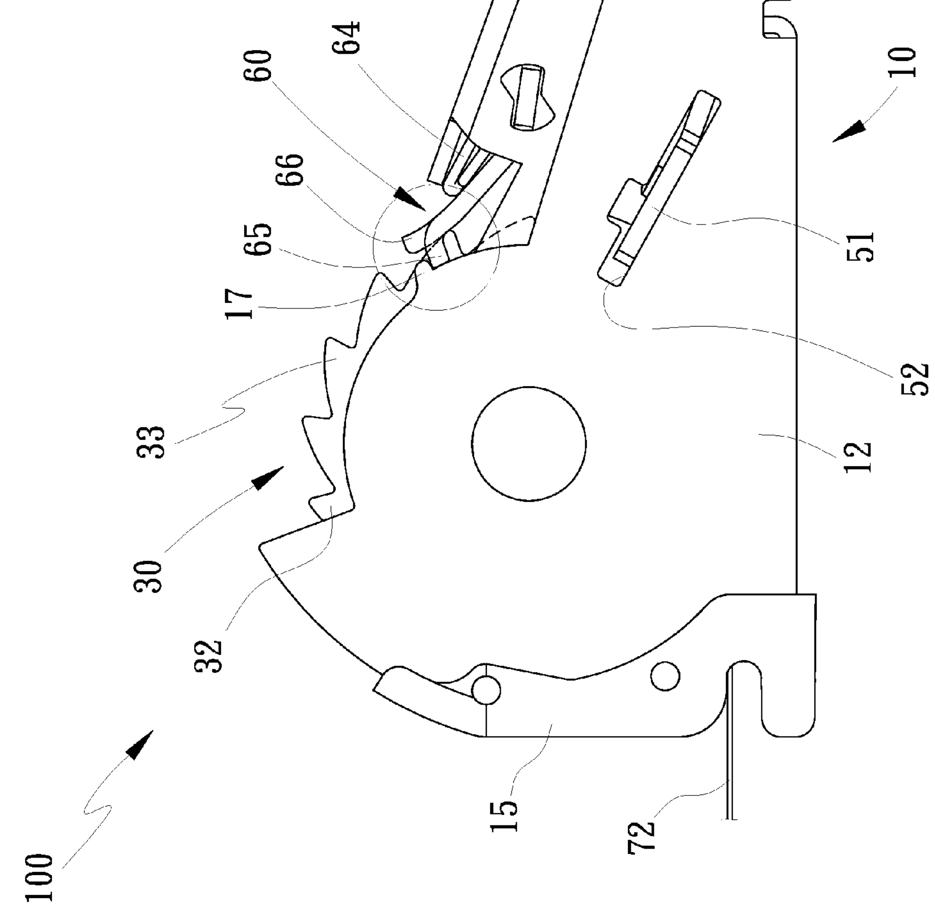
FIG. 3 is a side view of the strap-tightening device shown in FIG. 1.

Referring to FIGS. 3 and 4, the handle 20 is located against or near the frame 10. The lobes 24 of the cams 22 of the handle 20 are abutted against the wings 51 of the first detent 50, thus disengaging the wings 51 from the ratcheted wheels 32. As the second detent 60 is biased by the spring 64, the prongs 65 are restrained by the stops 17. Thus, the handle 20 cannot be pivoted from the frame 10. The lower side of each of the prongs 66 is located against an inclined edge of one of the ratchets 33 of a related one of the ratcheted wheels 32. A counterclockwise torque exerted on the reel 30 by the coil spring 41 is encountered by a clockwise torque exerted on the reel 30 by the spring 64. Thus, the second strap 72 cannot be withdrawn or reeled in automatically.

Figure 5:
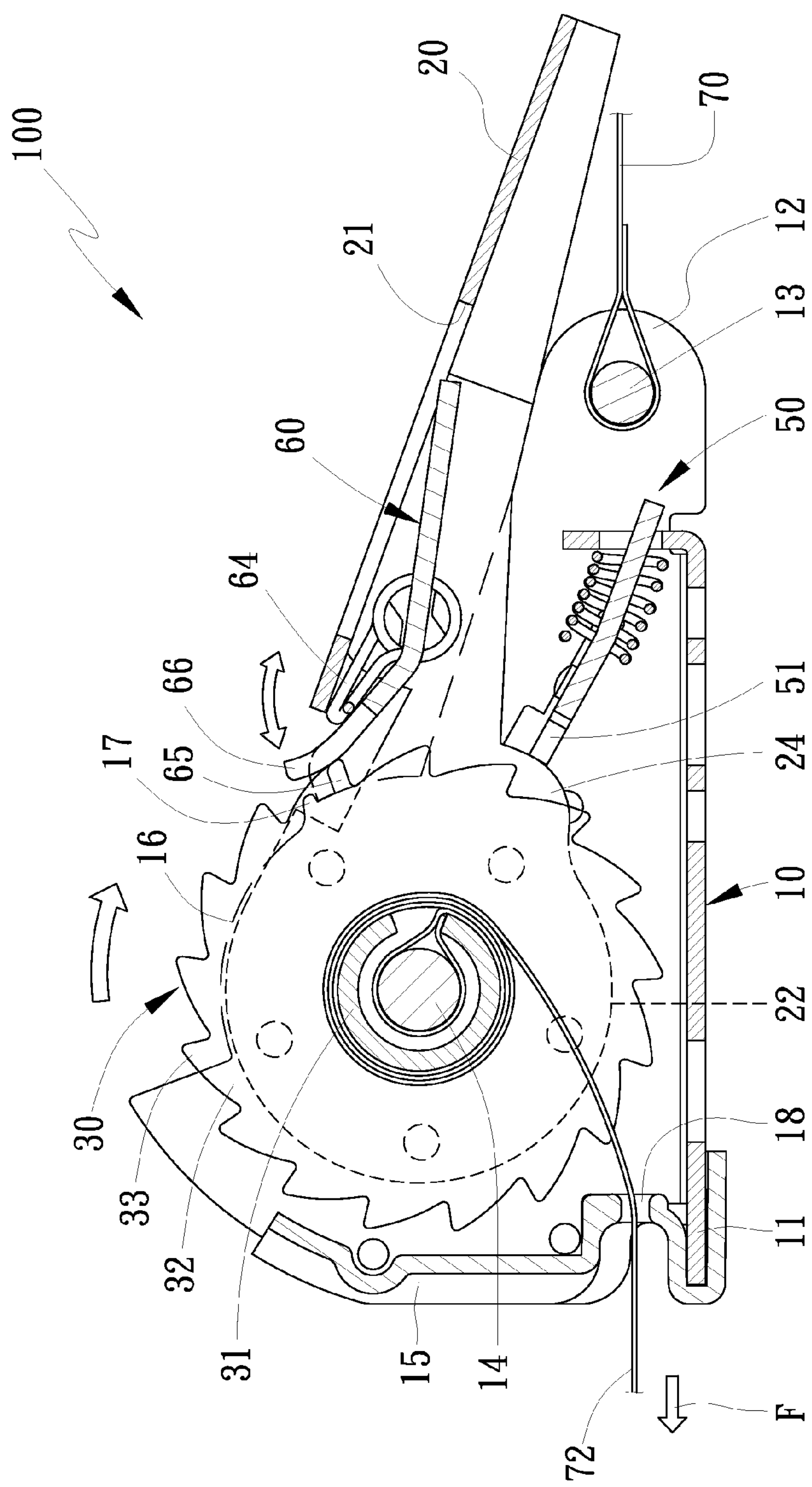
FIG. 5 is a cross-sectional view of the strap-tightening device shown in FIG. 3.

Referring to FIG. 5, a force F is exerted on the second strap 72. A clockwise torque exerted on the reel 30 because of the force F overcomes the counterclockwise torque exerted on the reel 30 by the coil spring 41. The second strap 72 begins to be reeled out. Even on the moment when the tip of one of the ratchets 33 of each of the ratcheted wheels 32 comes into contact with a related one of the prongs 66, the clockwise torque exerted on the reel 30 because of the force F is large enough to overcome the sum of the counterclockwise torque exerted on the reel 30 by the coil spring 41 and a counterclockwise torque exerted on the reel 30 by the spring 64. Thus, the second strap 72 continues to be reeled out.

Once the second strap 72 is stopped, the strap-tightening device 100 is returned back to the status shown in FIGS. 3 and 4. Thus, the second strap 72 cannot be withdrawn automatically. Hence, a user would not get hurt by automatic withdrawing of the second strap 72 or the hook 71 during the operation of reeling out the second strap 72. The hook 71 tied to the second strap 72 can be hooked onto a truck for example.

Figure 6:
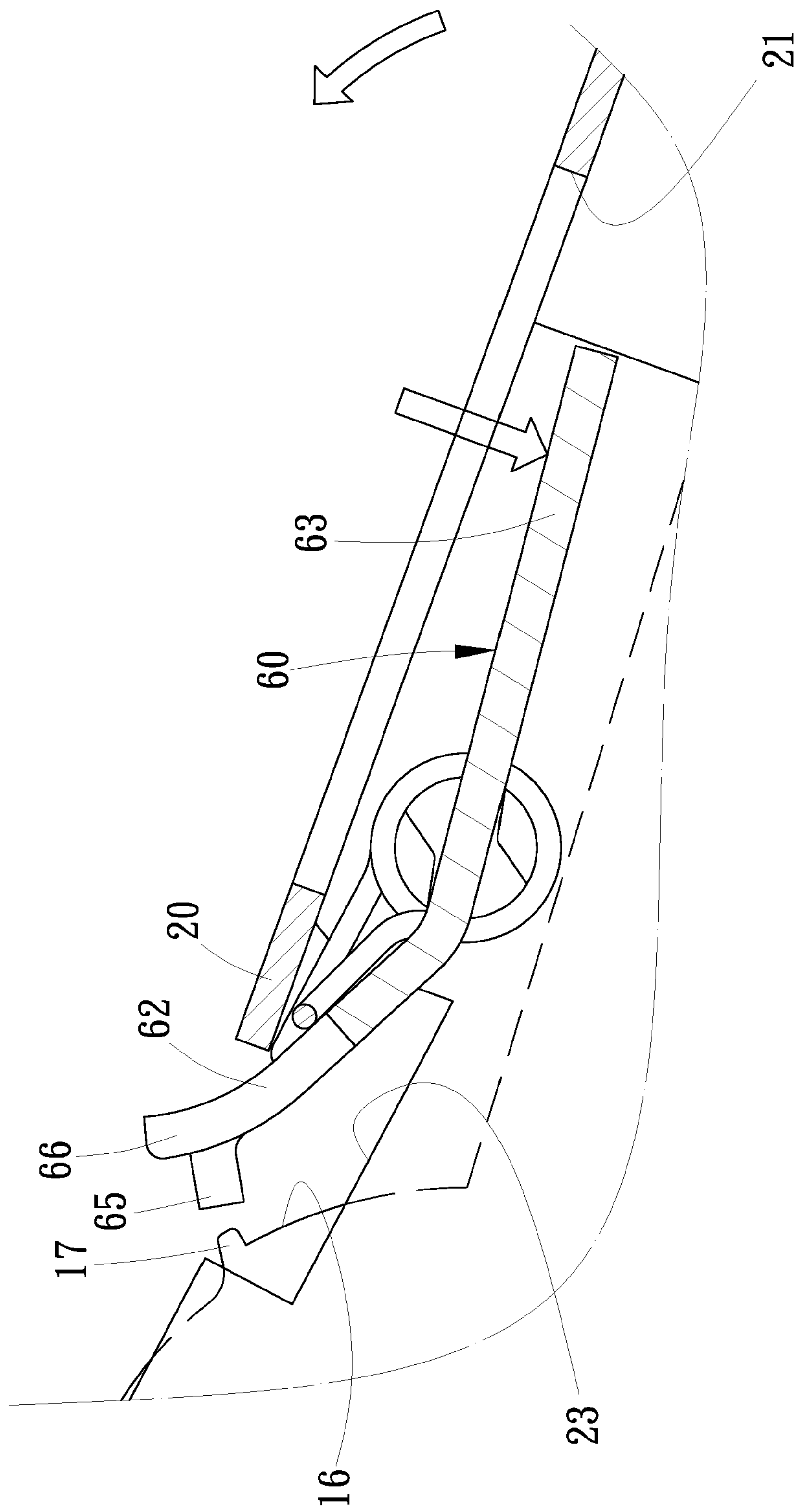
FIG. 6 is an enlarged, partial view of the strap-tightening device shown in FIG. 5.

Referring to FIG. 6, the tail 63 of the second detent 60 is pressed down with a finger or any proper tool inserted through the opening 21. Thus, the horns 62 are lifted, and the prongs 65 are removed from the arched edges 19 and the stops 17. Hence, the handle 20 can be pivoted from the frame 10 without spinning the reel 30.

Figure 8:
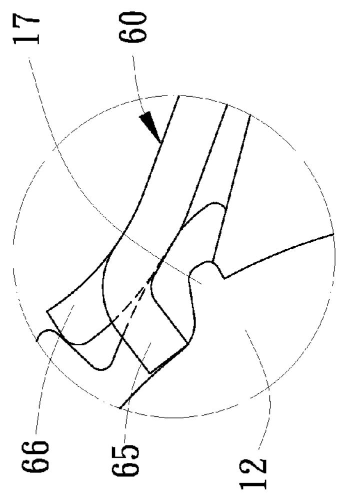
FIG. 8 is an enlarged, partial view of the strap-tightening device shown in FIG. 7.
Figure 7:
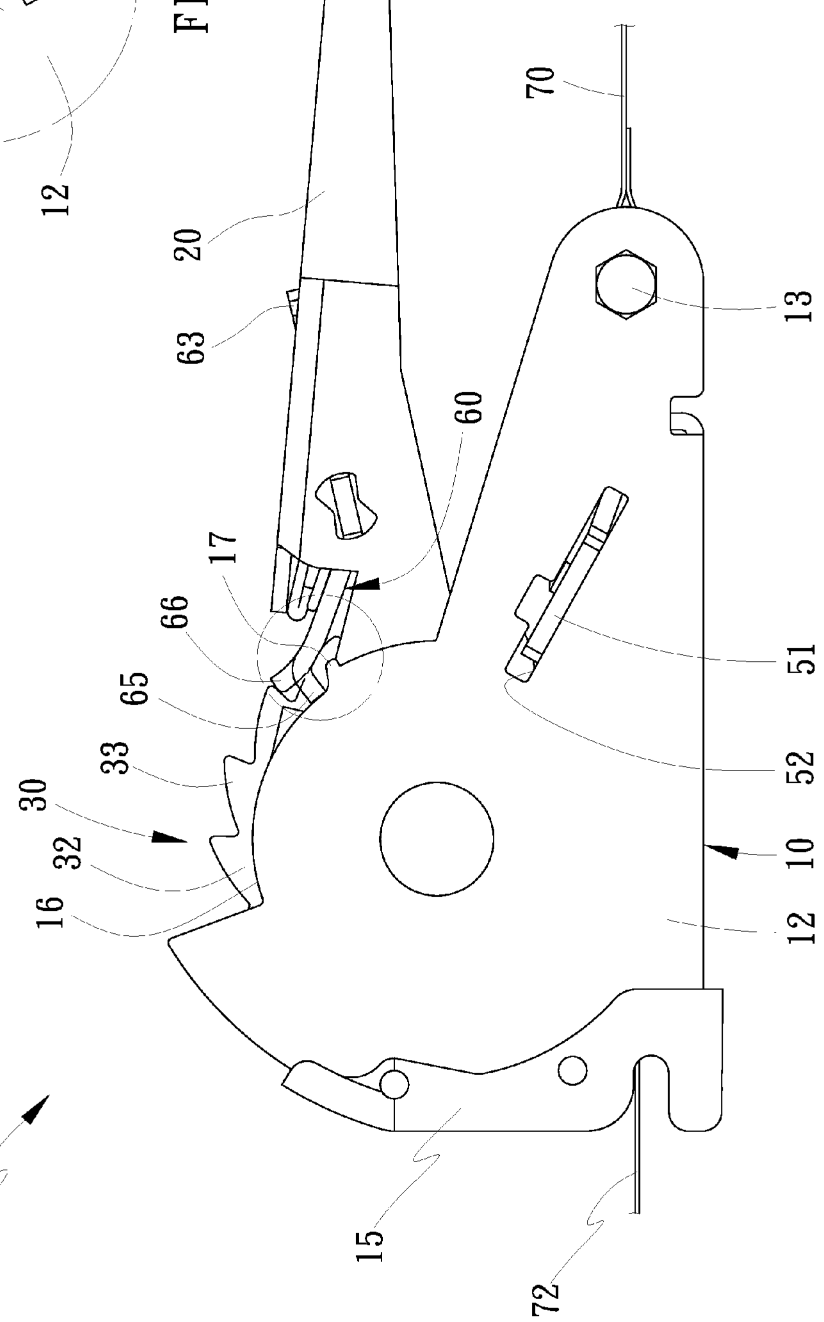
FIG. 7 is like FIG. 3 except showing the strap-tightening device in another position.

Referring to FIGS. 7 and 8, the tail 63 of the second detent 60 is released. Thus, the tip of each of the horns 62 is abutted against the vertical edge of one of the ratchets 33 of a related one of the ratcheted wheels 32. Each of the prongs 65 is in contact with or away from a related one of the arched edges 16 by a small gap.

Figure 9:
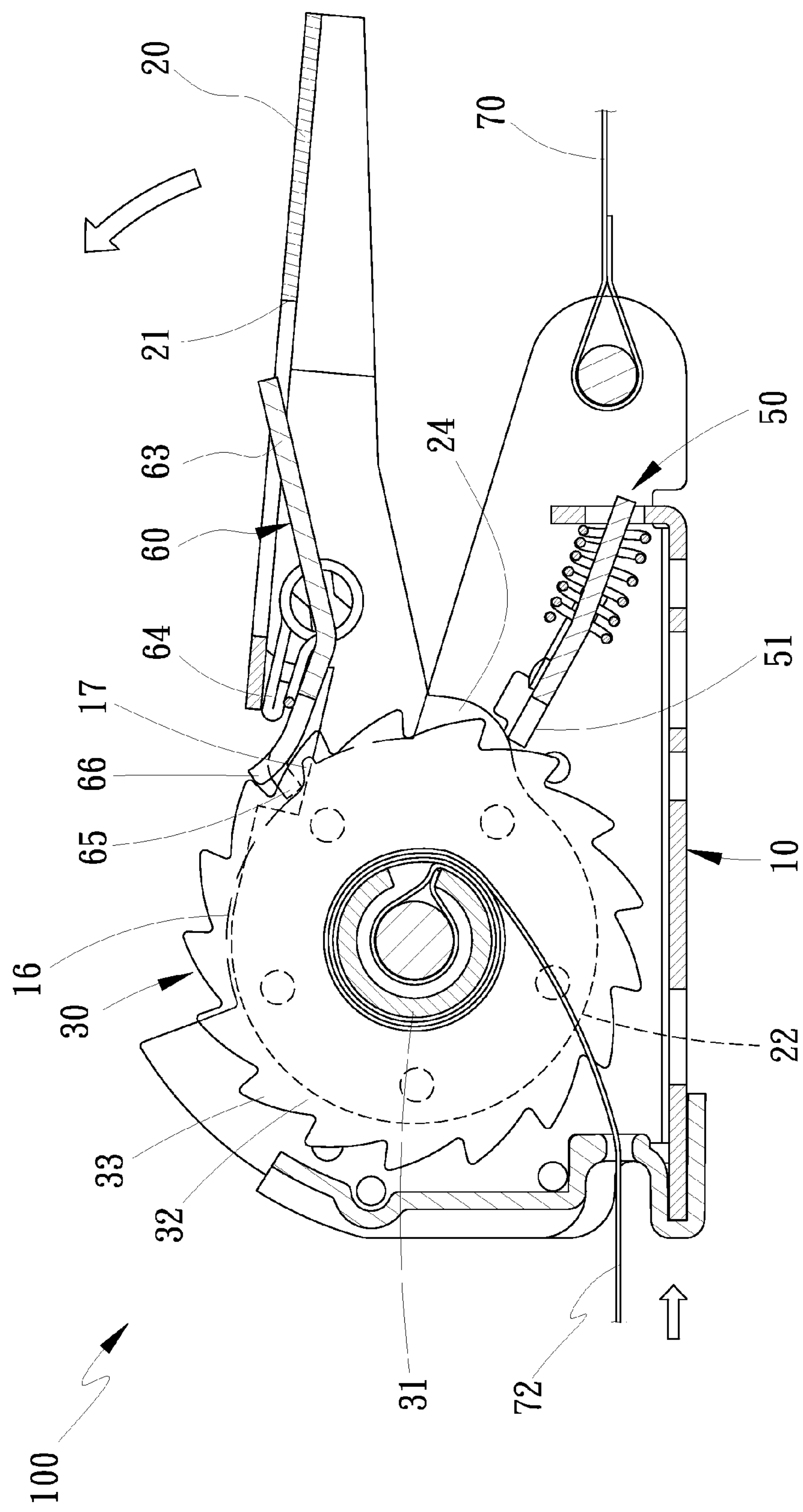
FIG. 9 is a cross-sectional view of the strap-tightening device shown in FIG. 7.
Figure 10:
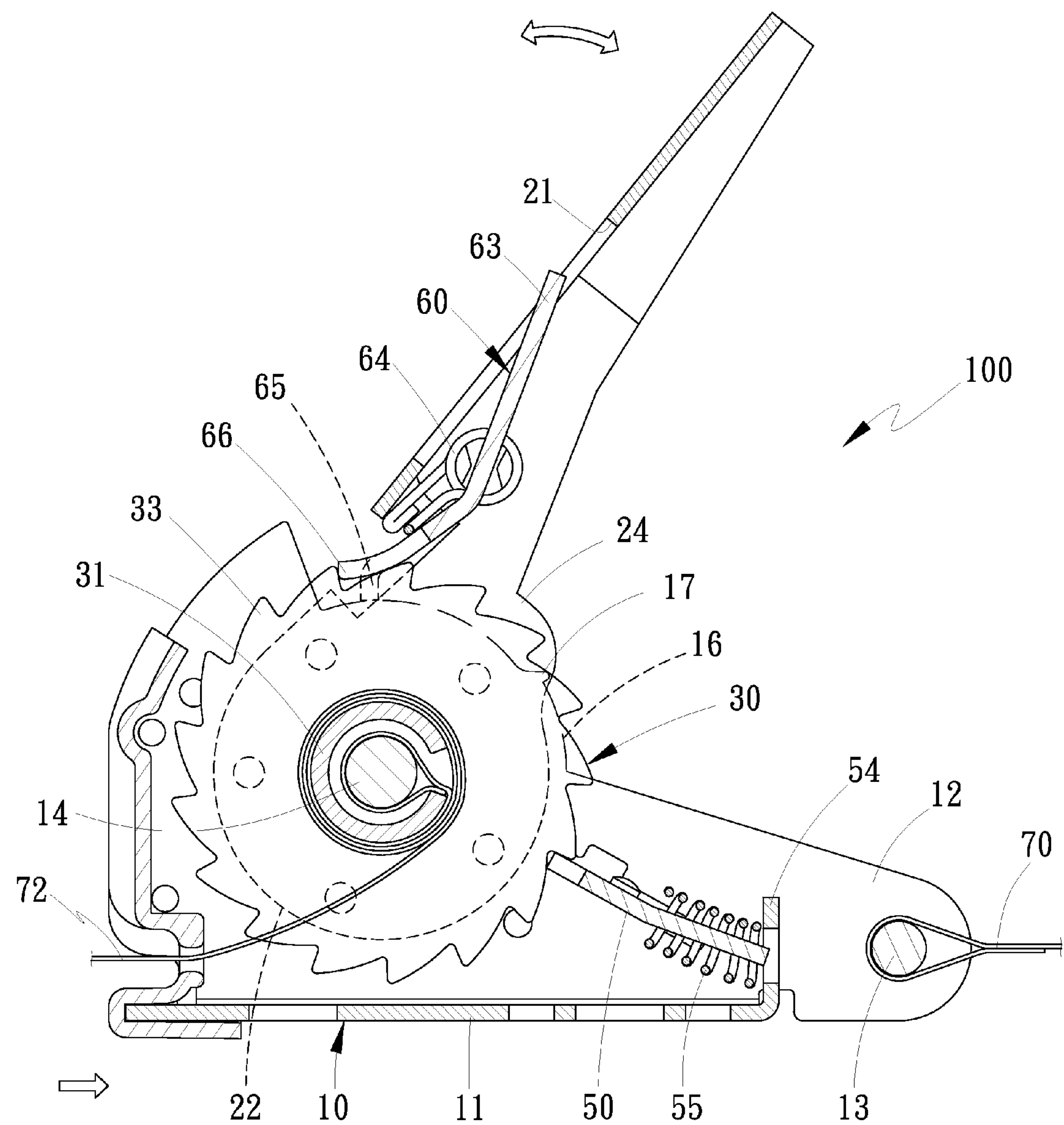
FIG. 10 is like FIG. 7 except showing the strap-tightening device in another position.

Referring to FIGS. 9 and 10, the handle 20 is pivoted further from the frame 10 to spin the reel 30 to reel in the second strap 72. Therefore, the first strap 70 and the second strap 72 are tightened.

To withdraw the second strap 72 for storage, the hook 71 tied to the second strap 72 is disengaged from the truck. Then, the tail 63 of the second detent 60 is pressed down with a finger or any proper tool inserted through the opening 21 as shown in FIG. 6. Thus, the horns 62 are lifted, and the prongs 66 are disengaged from the ratchets 33. Hence, the coil spring 41 is allowed to automatically spin the reel 30 to withdraw the second strap 72.

In practice, the tail 63 of the second detent 60 may not have to be pressed all the way down to allow the coil spring 41 to automatically spin the reel 30 to withdraw the second strap 72 while the ratchets 33 hit and move past the prongs 66. Thus, clicks are made to let any persons near the hook 71 tied to the second strap 72 know that they are withdrawn.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A strap-tightening device comprising:

a frame (10) including two walls (12) each including a first edge (19), a second edge (16) and a stop (17) formed between the first and second edges (19; 16);

a first spring-biased detent (50) located on the frame (10);

a handle (20) formed with two cams (22) and pivotally connected to the frame (10);

a second spring-biased detent (60) located on the handle (20), the second spring-biased detent (60) including a tail (63) and two horns (62) extending opposite to the tail (63) and each including a downward prong (65) and an upward prong (66);

a reel (30) rotationally located on the frame (10), the reel (30) including a cylinder (31) and two ratcheted wheels (32) attached to the cylinder (31) and each formed with ratchets, wherein the ratcheted wheels (32) are engaged with the upward prongs (66) of the horns (62) of the second spring-biased detent (60) during pivoting of the handle (20) in a direction to cause the cylinder (31) to reel in a strap (72), wherein the ratcheted wheels (32) are engaged with the first spring-biased detent (50) during pivoting of the handle (20) in an opposite direction to prevent the handle (20) from spinning the cylinder (31) to reel out the strap (72); and a withdrawing unit (40) including an end connected to the reel (30) and another end connected to the frame (10) for causing the reel (30) to withdraw the strap (72);

wherein the tail (63) can be pressed to lift the downward prongs (65) above the stops (17) to allow pivoting of the handle (20) between first and second modes;

wherein in the first mode, the handle (20) stays near the frame (10) so that the cams (22) disengage the first spring-biased detent (50) from the ratcheted wheels (32), and that the downward prongs (65) engage with the stops (17) to avoid pivoting of the handle (20) from the frame (10), and that the downward prongs (65) rest on the first edges (19) while a lower side of each of the upward prongs (66) contacts an inclined edge of any of the ratchets (33) of a related one of the ratcheted wheels (32) to allow the second spring-biased detent (60) to exert a torque on the reel (30) to encounter an opposite torque exerted by the withdrawing unit (40) to avoid withdrawing of the strap (72) but allow unwinding of the strap (72);

wherein in the second mode, the downward prongs (65) stay near the second edges (16) while each of the upward prongs (66) abuts a vertical edge of any of the ratchets (33) of a related one of the ratcheted wheels (32) so that the handle (20) can be pivoted to spin the reel (30) to reel in the strap (72), and that the tail (63) can be pressed to lift the upward prongs (66) from the ratchets (33) to allow the withdrawing unit (40) to spin the reel (30) to withdraw the strap (72).

2. The strap-tightening device according to claim 1, wherein the second spring-biased detent (60) includes two pivots (61) inserted in two apertures defined in the handle (20), thus pivotally connecting the second detent (60) to the handle (20).

3. The strap-tightening device according to claim 1, wherein the handle (20) includes an opening (21) to allow access to the tail (63) of the second spring-biased detent (60).

4. The strap-tightening device according to claim 1, including a lid (15) connected to the frame (10) for covering the ratcheted wheels (32).

5. The strap-tightening device according to claim 4, wherein the lid (15) includes slot (18) through which the strap (72) is inserted.

* * * * *